United States Patent Office.

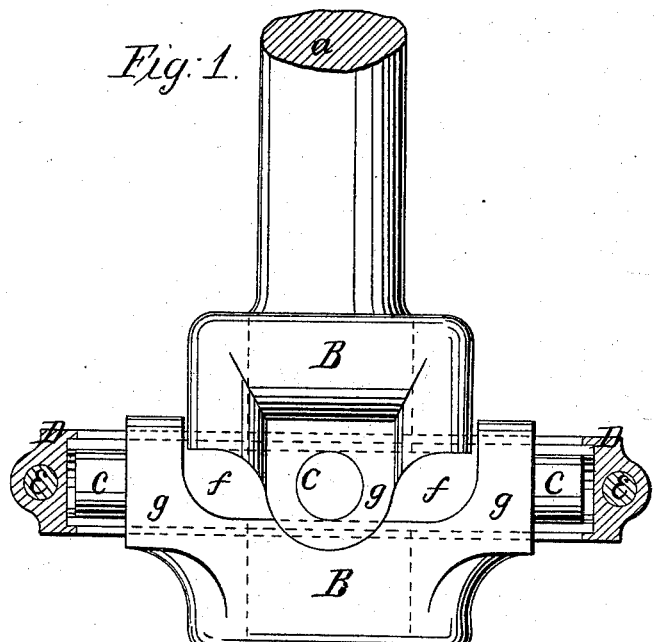
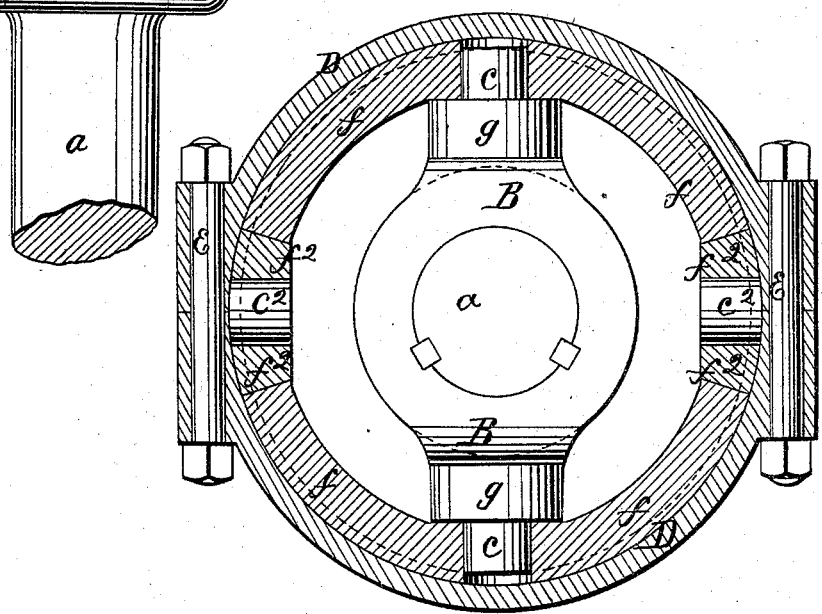

NORMAN W. WHEELER, OF BROOKLYN, NEW YORK.

Letters Patent No. 66,193, dated June 25, 1867.

---

IMPROVEMENT IN FLEXIBLE COUPLING.

---

*The Schedule referred to in these Letters Patent and making part of the same.*

---

TO ALL WHOM IT MAY CONCERN:

Be it known that I, NORMAN W. WHEELER, of the city of Brooklyn, county of Kings, and State of New York, have invented a new and useful Improvement in Flexible Couplings, for the purpose of connecting together revolving shafts in such a way that changes in their alignment shall not affect, in any great degree, the journals or the machines of which they form a part; and I hereby declare that the following is a full and exact description of the construction and operation thereof, reference being had to the accompanying drawing, with letters of reference marked thereon, forming a part of this specification; in which—

Figure 1 represents an elevation; and

Figure 2, a sectional end view of the coupling—

Like letters indicating the same parts in both figures.

I regard my invention as a modification of and an improvement upon that which is called the "universal joint" or "Hooke's coupling," except in the feature of my invention which allows end play to the shafts, with but little abnormal strain to the parts, the object being to connect together two or more lengths of shafting in such a way that, if the ship, building, or foundation upon which the bearings rest, be disturbed so as to throw the shafts out of line, excessive friction upon the journals may be avoided, and that the wear of the parts may be compensated for by a ready means of taking up the lost motion resulting from wear of the coupling.

To put my invention into practice I secure upon the ends of the two shafts $a\ a$, which are to be coupled, the coupling-heads B B, each with two bosses $g\ g$, which bosses form rim-bases for the trunnions $c\ c\ c\ c$, the trunnions overhanging the ends of the shafts so far that the trunnions $c\ c\ c\ c$ may be brought into the same plane without bringing the ends of the shafts or the coupling-heads in contact with each other. I then fit four chock-pieces $f\ f\ f\ f$ to the trunnions $c\ c\ c\ c$, with the partings at the trunnion-bearings, $c_2\ c_2$, &c., and clamp the whole together with the recessed clamp-ring D D, which ring is made in two or more parts, and held together by the bolts E E, the recess of the ring D D fitting over the chock-pieces $f\ f\ f\ f$ and holding them securely in place. After the coupling has worn so much as to exhibit lost motion, it may be re-adjusted by the usual method in analogous cases, viz, by filing off the faces of the two parts of the ring D D where they come together, when, by bringing together the new faces, the chock-pieces $f\ f\ f\ f$ will be brought again into close contact with the trunnions $c\ c\ c\ c$, the ring D D springing enough to accommodate the slight distortion resulting from the operation. If standing bolts were put into the ends of the trunnions $c\ c\ c\ c$, with nuts upon them controlling washers large enough to cover the ends of the chock-pieces $f\ f\ f\ f$, and hold them from spreading, then the clamp-ring D D might be dispensed with, for the nuts, bolts, and washers would perform its functions. This and equivalent devices I consider colorable variations of my invention. To provide for end play of the shafts I divide the chock-pieces $f\ f\ f\ f$ radially, as seen at $f_2\ f_2\ f_2\ f_2$, and make the pieces $f_2\ f_2\ f_2\ f_2$ so narrow in relation to the recess of the ring D D, into which they are fitted, that they will not fill it, the recess, by so much as the end play desired, when the two trunnions attached to one shaft will move back and forth within the ring to the extent allowed without straining the parts.

Having thus described my invention, I will indicate that which I believe to be new and useful, and for which I desire to secure Letters Patent, viz: I claim—

1. The combination of the coupling-heads B B, chock-pieces $f\ f\ f\ f$, and clamp-ring D D, substantially as and for the purposes described.

2. In combination with the above, dividing and constructing the chock-pieces $f\ f\ f\ f$ and $f_2\ f_2\ f_2\ f_2$, substantially as and for the purposes described.

NORMAN W. WHEELER.

Witnesses:
EDWIN C. SHOARDS,
F. C. PRINDLE.